United States Patent Office 2,936,306
Patented May 10, 1960

2,936,306
AZO-DYESTUFFS

Max Schmid and Willy Mueller, Riehen, Switzerland, assignors to Ciba Limited, Basel, Switzerland, a Swiss firm No Drawing. Application May 8, 1958
Serial No. 733,851

Claims priority, application Switzerland May 17, 1957

8 Claims. (Cl. 260—176)

The present invention provides new azo-dyestuffs which correspond to the general formula $R_2$—NHCO—B—N=N—A—N=N—B—CONH—$R_2$ in which A represents the radical of a coupling component containing two enolizable keto-methylene groups, each symbol B represents an aryl radical, and $R_2$ represents an organic radical.

The invention also provides a process for the manufacture of the dyestuffs corresponding to the above formula, wherein two molecular proportions of a primary monamine free from groups imparting solubility in water are condensed with one molecular proportion of a dihalide of a dicarboxylic acid of the formula (1)  HOOC—B—N=N—A—N=N—B—COOH which is free from groups imparting solubility in water, in which formula A represents the radical of a coupling component containing two enolizable keto-methylene groups, and each symbol B represents an aryl radical.

The dicarboxylic acids of the Formula 1, of which the dihalides are used as starting materials in the process of this invention, may contain as the radical A a dipyrazolone radical, for example, a radical of the formula (2) 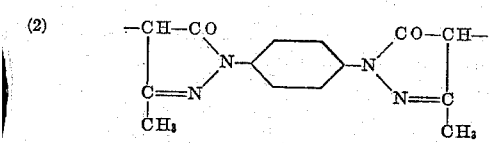

or (3) 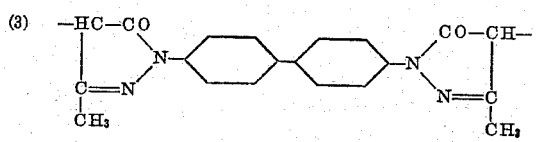

Of special interest are those dicarboxylic acids which correspond to the formula (4) 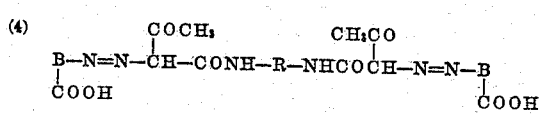

in which R and B represent aryl radicals. B is advantageously a benzene radical, and R is, for example, a diphenyl radical and advantageously a benzene radical bound to the —NH— groups in the 1:4-positions, and which contains in the nucleus at least one substituent, for example, a halogen atom or an alkyl or alkoxy group.

The aforesaid dicarboxylic acids are advantageously prepared by coupling two molecular proportions of diazotized monoamine-monocarboxylic acid which is free from groups imparting solubility in water and is advantageously of the aromatic series, with one molecular proportion of a coupling component which is free from groups imparting solubility in water and contains two enolizable keto-methylene groups, advantageously a compound of the formula $CH_3COCHCO$—HN—R—NH—$COCHCOCH_3$ which can be obtained in a simple manner by the reaction of diketene or acetoacetic acid ester with an aromatic diamine. As examples of suitable coupling components there may be mentioned the bis-acetoacetyl-compounds of the following diamines:

1:4-diaminobenzene,
1:3-diaminobenzene,
1:3-diamino-4-methylbenzene,
1:3-diamino-4-methoxybenzene,
1:3-diamino-4-chlorobenzene,
1:4-diamino-2-chlorobenzene,
1:4-diamino-2-bromobenzene,
1:4-diamino-2:5-dichlorobenzene,
1:4-diamino-2-methylbenzene,
1:4-diamino-2:5-dimethylbenzene,
1:4-diamino-2-methoxybenzene,
1:4-diamino-2:5-dimethoxybenzene,
1:4-diamino-2:5-diethoxybenzene,
1:3-diamino-4:6-dimethylbenzene,
1:3-diamino-2:6-dimethylbenzene,
4:4'-diamino-diphenyl,
3:3'-dichloro-4:4'-diaminodiphenyl,
3:3'-dimethyl-4:4'-diaminodiphenyl,
3:3'-dimethoxy-4:4'-diaminodiphenyl,
3:3':5:5'-tetrachloro-4:4'-diaminodiphenyl,
3:3'-dichloro-5:5-dimethyl-4':4'-diaminodiphenyl,
4:4'-diamino-diphenylmethane,
4:4'-dimethoxy-3:3'-diamino-diphenylmethane,
4:4'-diamino-diphenylamine,
4:4'-diamino-diphenyl oxide,
4:4'-diamino-diphenyl ketone,
2:8-diaminochrysene,
4:11-diamino-fluoranthene,
2:6- or 1:5-diaminonaphthalenes,
Diaminobenzthiazoles, such as 2-(4'-aminophenyl)-6-aminobenzthiazole, and the amines of the formulae

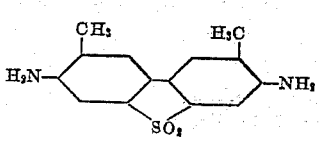

Some of the bis-acetoacetyl compounds of the aforesaid amines are known. The bis-acetoacetyl-compounds can be obtained in known manner by reacting one molecular proportion of an appropriate diamine with two molecular proportions of acetoacetic acid ester or advantageously diketene.

As examples of suitable diazo-components there may be mentioned:

1-aminobenzene-3-carboxylic acid,
1-aminobenzene-4-carboxylic acid,
1-amino-2-methylbenzene-4-carboxylic acid,
1-amino-2-chlorobenzene-4-carboxylic acid,
1-amino-2-chlorobenzene-5-carboxylic acid,
1-amino-4-chlorobenzene-5-carboxylic acid,
1-amino-2-methoxybenzene-5-carboxylic acid,
1-amino-2-chloro-5-methoxybenzene-4-carboxylic acid,
1-amino-2:4-dichlorobenzene-5-carboxylic acid,
1-amino-2-nitrobenzene-5-carboxylic acid,
4'-amino-diphenyl-4-carboxylic acid.

The azo-dicarboxylic acids of the Formula 1 are treated with an agent capable of converting carboxylic acids into halides thereof, for example, their bromides or chlorides. As examples of such agents there may be mentioned phosphorus halides, for example, phosphorus trichloride, phosphorus pentachloride and phosphorus oxychloride, and more especially thionyl chloride. The treatment with such acid-halogenating agents is advantageously carried out in an inert organic solvent, such as a chlorobenzene, for example, mono- or di-chlorobenzene, toluene, xylene, benzene or nitrobenzene. When thionyl chloride is used as acid-chlorinating agent it is of advantage to work in the presence of a dialkyl-formamide, more especially dimethyl formamide.

In preparing the carboxylic acid dihalides it is generally of advantage first to dry the azo-compounds that have been prepared in an aqueous medium, or to remove the water therefrom by boiling them in an organic solvent accompanied by azeotropic distillation. This azeotropic drying, may, if desired, be carried out immediately before the treatment with the acid-halogenating agent.

In the process of this invention the dicarboxylic acid halides so obtained are reacted with primary amines, advantageously those of the aromatic series. As suitable amines there may be mentioned principally those of the benzene series, for example, unsubstituted aniline, nuclear halogenated anilines, for example, ortho-, para- or metachloraniline, 2:5-dichloraniline, 3:4:5 trichloraniline, para-bromaniline, nitranilines such as ortho-, para- or meta-nitraniline, alky-anilines, for example, ortho- or parametho xyaniline, nuclear alkylated anilines such as nuclear alkylated toluidines or meta-xylidines, or halogen-alkyl anilines such as 3-trifluoromethyl-aniline or 3:5-di-(trifluoromethyl)-aniline, or phenyl-anilines such as para-aminodiphenyl, or aniline containing functionally converted carboxy groups, for example, carboxylic acid ester groups, cyano groups or carboxylic acid phenyl-amide groups. Among these latter compounds there may be mentioned the following:

Aniline-2-carboxylic acid ethyl ester,
Aniline-3-carboxylic acid methyl ester,
Aniline-3:5-dicarboxylic acid dimethyl ester,
3-cyano-aniline,
3- or 4-aniline carboxylic acid anilide.

There may also be used anilines containing various substituents, for example, 2-chloro-5-methylaniline,
4-chloro-2-methylaniline,
2-methyl-5-chloraniline,
2-chloro-4-nitroaniline,
2-chloro-5-trifluoromethylaniline,
4-chloro-2-trifluoromethylaniline,
2-nitro-4-chloraniline,
4-chloro-2-methoxyaniline,
2-chloro-4-methoxyaniline,
4-chloro-2-methoxy-5-methylaniline,
2-nitro-4-methylaniline,
4- or 5-nitro-2-methylaniline
4-nitro-2-methoxyaniline,
4-chloro-2:5-dimethoxyaniline.

There may also be used polynuclear aromatic amines, for example, aminonapthalenes, aminoanthraquinone or aminopyrene.

The condensation of the carboxylic acid halides of the kind defined above with the amines is advantageously carried out in an anhydrous medium. Under these conditions the condensation usually takes place surprisingly easily even at temperatures within the boiling range of normal organic solvents, such as toluene, monochlorobenzene, dichlorobenzene, trichlorobenzene, nitrobenzene and the like. In order to accelerate the reaction it is generally of advantage to use an acid-binding agent, such as anhydrous sodium acetate or pyridine. Some of the dyestuffs so obtained are crystalline and others are amorphous, and they are generally obtained in very good yield and in pure state. It is of advantage first to separate the acid chlorides obtained from the carboxylic acids. In some cases separation of the acid chlorides may be dispensed with without harm, so that the condensation is then carried out directly following the preparation of the carboxylic acid chlorides.

The dyestuffs of this invention are valuable pigments which, owing to their insolubility in organic solvents and their heat resistance, are excellently suited for dyeing plastic materials, especially polyvinyl compounds, tints which range from greenish yellow to orange. Of special interest are the dyestuffs of the general formula

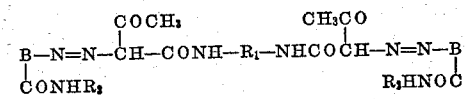

in which $R_1$ and B represent aryl radicals. These dyestuffs are distinguished by their especially good fastness to light and migration. In addition to dyeing plastic compositions, the dyestuffs of this invention can be used for so-called pigment printing, that is to say, a printing process in which a pigment is fixed on a substratum, especially textile fibers, or on other sheet-like structures, such as paper, for example, wallpaper or fabrics of glass fibers, by means of a suitable adhesive, such as casein, a hardenable synthetic resin, especially a urea-formaldehyde or melamine-formaldehyde condensation product, polyvinyl chloride or polyvinyl acetate solutions or emulsions or other emulsions (for example, oil-in-water or water-in-oil emulsions).

The pigments of this invention can also be used, for example, in finely dispersed form for dyeing artificial silk from viscose or cellulose ethers or esters or superpolyamides or superpolyurethanes in the spinning mass, and also for the preparation of colored lacquers or lacquer formers, solutions and products of acetyl-cellulose, nitrocellulose, natural resins or synthetic resins, such as polymerization or condensation resins, for example, aminoplasts, phenoplasts, polystyrene, polyethylene, polyacrylates, rubber, casein, silicone or silicon resins. They are also of advantage for the manufacture of colored pencils, cosmetic preparations or laminated sheets.

Preparations which contain such pigments in finely dispersed form, can be obtained in known manner by intense mechanical treatment, for example, on a roller mill or in a suitable kneading apparatus. The dispersion medium in which the intense mechanical treatment is carried out, is chosen depending on the manner in which the preparation is to be used, for example, for the production of preparations that are dispersible in water there may be used sulfite cellulose waste liquor, or a salt of dinaphthylmethane disulfonic acid may be used for the production of cellulose acetate artificial silk spinning compositions by mixing the salt in a small amount of solvent with acetyl cellulose.

Owing to the especially favorable physical form in which the products of the invention are usually obtained, and owing to their chemical inertness and good heat resistance, they can generally be dispersed easily in compositions or preparations of the above kind, and this is advantageously carried out at a stage at which the composition or preparation has not reached its final form. The necessary operations for shaping, such as spinning, pressure-moulding, hardening, casting, sticking or the like, can also be carried out in the presence of the pigments of this invention, without any chemical reaction of the substratum, such as further polymerization or condensation, being hindered.

The following examples illustrate the invention, the parts and percentages being by weight:

*Example 1*

66.9 parts of the dyestuff obtained from 2 mols of diazotized 4-chloro-3-aminobenzoic acid and 1 mol of 2:5-bis-acetoacetylamino-1:4-dimethylbenzene of the formula

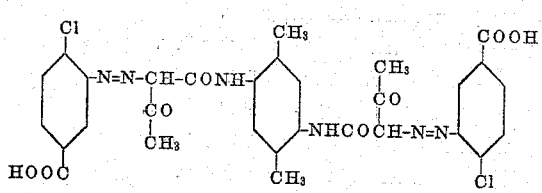

are stirred in 600 parts of ortho-dichlorobenzene with 5 parts of dimethylformamide and heated to 95–100° C. At that temperature 32.8 parts of thionyl chloride are run in in the course of 15 minutes, and the whole is then stirred for a further 2 hours at 100–110° C. The reaction mixture is in this manner converted into a thick crystalline magma. The end of the reaction can be recognized by the cessation of the evolution of hydrogen chloride, and by the fact that a test sample examined under the microscope consists of unitary reddish yellow needles. The mixture is then allowed to cool to 80° C. and filtered with suction. The filter residue is washed with ortho-dichlorobenzene until the filtrate is almost colorless. The crystalline mass is then washed with benzene and towards the end with petroleum ether. After drying the product in vacuo at 50–60° C., there are obtained 65 parts of the dyestuff acid chloride as an orange crystalline powder. It is very sparingly soluble in organic solvents. It can be recrystallized from hot nitrobenzene in small amounts. At temperatures above 280° C. it decomposes without melting.

14.12 parts of the acid chloride so obtained are heated in 200 parts of ortho-dichlorobenzene with 0.1 part of thionyl chloride up to 100° C. A solution of 3.8 parts of aniline and 2 parts of pyridine in 20 parts of dichlorobenzene is then added and the whole is stirred for 12 hours at 135–140° C. The pigment so formed is filtered off with suction while hot and washed with hot ortho-dichlorobenzene until the washings are completely colorless. The ortho-dichlorobenzene is then displaced by methanol, and the product is finally washed with hot water. By drying the product there is obtained a loose soft pigment, which is practically insoluble in the usual solvents, and when rolled into polyvinyl chloride yields bright rich reddish yellow tints of very good fastness to migration and light. The pigment so obtained corresponds to the formula

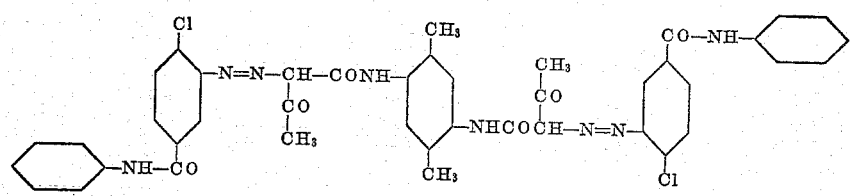

*Example 2*

33.45 parts of the dry dyestuff obtained from 2 mols of diazotized 4-chloro-3-aminobenzoic acid and 1 mol of 2:5-bis-acetoacetylamino-1:4-dimethylbenzene are stirred in 500 parts of orthodichlorobenzene with 2.5 parts of dimethylformamide and heated to 95° C. 16.4 parts of thionyl chloride are run in in the course of 10 minutes and then the whole is heated for 2 hours at 105–110° C. When the evolution of hydrogen chloride has subsided, a gentle current of air is sucked through the flask for 15 minutes in order to remove excess of thionyl chloride, hydrogen chloride and sulfur dioxide. 10.7 parts of ortho-toluidine and 5 parts or pyridine in 50 parts of ortho-dichlorobenzene are then rapidly added, and the reaction mixture is heated for 12 hours at 135–140° C. The whole is then allowed to cool to 90° C., 5 parts of anhydrous sodium acetate are added, and the whole is stirred at that temperature for 15 minutes. The mixture is then filtered with suction, the filter residue is washed with hot ortho-dichlorobenzene until the washings are colorless. It is then washed with methanol, the washings being strongly colored at first. Towards the end the product is washed thoroughly with hot water, and then dried at 95–100° C. in vacuo. There is obtained a loose soft yellow powder, which, when incorporated in plastic compositions, especially a polyvinyl chloride composition, yields reddish yellow tints which are fast to migration and very fast to light. By pigment printing there are obtained with this product prints that are fast to solvents.

In the following table are given further acid amide derivatives of azo-dyestuff dicarboxylic acids, which are obtained by coupling 2 mols of an aminoaryl-carboxylic acid mentioned in column I with 1 mol of the bis-acetoacetyl-aryl compound mentioned in column II. The azo-dyestuff dicarboxylic acids are converted with thionyl chloride into the dicarboxylic acid dichlorides and condensed with two mols of an arylamine mentioned in column III.

| | I<br>Diazo-component | II<br>Coupling component | III<br>Arylamine | IV<br>Tint of material dyed with the dyestuff |
|---|---|---|---|---|
| 1 | 4-Chloro-3-amino-benzoic acid | 2:5-Bis-acetoacetyl-amino-1:4-dimethyl-benzene. | o-Chloraniline | pure yellow. |
| 2 | ---do--- | ---do--- | 4-Chloro-6-toluidine | reddish yellow. |
| 3 | ---do--- | ---do--- | 2-Methoxy-5-methyl-aniline | Do. |
| 4 | ---do--- | ---do--- | 2-Methoxy-aniline | greenish yellow. |
| 5 | ---do--- | ---do--- | 3-Chloro-2-methyl-aniline | pure yellow. |
| 6 | ---do--- | ---do--- | 5-Chloro-2-amino-toluene | reddish yellow. |
| 7 | ---do--- | ---do--- | 4-Methoxy-aniline | orange yellow. |
| 8 | ---do--- | ---do--- | m-Xylidine | greenish yellow. |
| 9 | ---do--- | ---do--- | 2:5-Dimethoxy-aniline | orange yellow. |
| 10 | ---do--- | ---do--- | α-Naphthylamine | orange. |
| 11 | ---do--- | ---do--- | β-Naphthylamine | Do. |
| 12 | 4-Methoxy-3-amino-benzoic acid | 2:5-Bisacetoacetylamino-1:4-dimethylbenzene. | Aniline | reddish yellow. |
| 13 | ---do--- | ---do--- | o-Toluidine | yellow-orange. |
| 14 | ---do--- | ---do--- | o-Anisidine | reddish yellow. |
| 15 | ---do--- | ---do--- | o-Chloraniline | pure yellow. |
| 16 | 4-Aminobenzoic acid | ---do--- | Aniline | Do. |
| 17 | ---do--- | ---do--- | o-Toluidine | greenish yellow. |
| 18 | 3-Nitro-4-aminobenzoic acid | 2:5-Dichloro-1:4-bis-acetoacetyl-aminobenzene. | Aniline | yellow-orange. |
| 19 | ---do--- | ---do--- | o-Toluidine | reddish yellow. |
| 20 | 4-Chloro-3-aminobenzoic acid | ---do--- | Aniline | very greenish yellow. |
| 21 | ---do--- | ---do--- | o-Toluidine | greenish yellow. |
| 22 | 4-Chloro-3-aminobenzoic acid | 2:5-Dichloro-1:4-bis-acetoacetyl-aminobenzene. | o-Anisidine | very greenish yellow. |
| 23 | ---do--- | ---do--- | 2:5-Dichloro-aniline | greenish yellow. |
| 24 | ---do--- | 2-Chloro-1:4-bis-acetoacetyl-aminobenzene. | Aniline | Do. |
| 25 | ---do--- | ---do--- | o-Toluidine | pure yellow. |
| 26 | ---do--- | ---do--- | o-Anisidine | greenish yellow. |
| 27 | ---do--- | ---do--- | 5-Chloro-2-methoxy-aniline | pure yellow. |
| 28 | ---do--- | 2-Methoxy-1:4-bis-acetoacetyl-aminobenzene. | Aniline | pure orange. |
| 29 | ---do--- | ---do--- | o-Toluidine | yellow orange. |
| 30 | ---do--- | ---do--- | 5-Chloro-2-methoxy-aniline | orange yellow. |
| 31 | ---do--- | ---do--- | 5-Methyl-4-Chloro-2-methoxy-aniline. | orange. |
| 32 | ---do--- | ---do--- | Aminopyrene | reddish yellow. |
| 33 | ---do--- | 2:5-Dimethoxy-1:4-bis-acetoacetyl-amino-benzene. | Aniline | scarlet red. |
| 34 | ---do--- | ---do--- | o-Toluidine | scarlet. |
| 35 | ---do--- | ---do--- | 4-Chloro-2-anisidine | Do. |
| 36 | ---do--- | ---do--- | Chloro-cresidine | red orange. |
| 37 | 4-Methoxy-3-aminobenzoic acid | 2:6-Bis-aceto-acetyl-amino-1:3-dimethyl-benzene. | Aniline | greenish yellow. |
| 38 | ---do--- | ---do--- | Chloro-cresidine | Do. |
| 39 | ---do--- | ---do--- | o-Toluidine | reddish yellow. |
| 40 | ---do--- | ---do--- | Aniline | pure yellow. |
| 41 | ---do--- | ---do--- | o-Anisidine | greenish yellow. |
| 42 | ---do--- | ---do--- | 4-Chloro-2-anisidine | pure yellow. |
| 43 | ---do--- | 2-Methoxy-5-chloro-1:4-bis-acetoacetyl-aminobenzene. | Aniline | yellow. |
| 44 | 4-Chloro-3-aminobenzoic acid | ---do--- | o-Toluidine | reddish yellow. |
| 45 | ---do--- | ---do--- | o-Anisidine | Do. |
| 46 | ---do--- | ---do--- | 4-Chloro-2-anisidine | pure yellow. |
| 47 | ---do--- | ---do--- | 4-Chloro-2-aminotoluene | yellow-orange. |
| 48 | ---do--- | ---do--- | 6-Chloro-2-aminotoluene | orange. |
| 49 | ---do--- | 2-Methyl-5-chloro-1:4-bis-acetoacetyl-aminobenzene. | o-Toluidine | greenish yellow. |
| 50 | ---do--- | ---do--- | 5-Chloro-2-aminotoluene | Do. |
| 51 | ---do--- | 2:3:5:6-Tetrachloro-1:4-bis-acetoacetyl-aminobenzene. | o-Toluidine | Do. |
| 52 | ---do--- | 2:5-Dimethyl-3:6-dichloro-1:4-bis-acetoacetyl-aminobenzene. | o-Anisidine | Do. |
| 53 | ---do--- | 2-Methoxy-1:4-bis-acetoacetyl-amino-benzene. | 2-Aminopyrene | yellow. |
| 54 | ---do--- | 2:5-Dimethyl-1:4-bis-acetoacetyl-amino-benzene. | J-Naphthylamine | reddish yellow. |
| 55 | ---do--- | 2:5-Dichloro-1:4-bis-acetoacetyl-amino-benzene. | 5-Chloro-1-amino-anthraquinone | yellow. |
| 56 | ---do--- | 2:5-Dimethyl-1:4-bis-acetoacetyl-amino-benzene. | 1-Amino-5-benzoylamino-anthraquinone. | brownish yellow. |
| 57 | 3-Methyl-4-aminobenzoic acid | 2:5-Dichloro-1:4-bis-acetoacetyl-amino-benzene. | Aniline | reddish yellow. |
| 58 | 4-Methoxy-3-amino-benzoic acid | 2:5-Dimethyl-1:4-bis-acetoacetyl-amino-benzene. | N-ethyl-aniline | pure yellow. |

*Example 3*

67.6 parts of the dyestuff obtained from 2 mols of diazotized para-aminobenzoic acid and 1 mol of 4:4'-bis-acetoacetylamino-3:3'-dimethyl-diphenyl are stirred in 800 parts of ortho-dichlorobenzene with 10 parts of dimethyl formamide and heated up to 100° C. 32.8 parts of thionyl chloride are run in at 100–105° C. in the course of 10 minutes, and the whole is stirred for a further 3 hours at 110–115° C. The end point of the reaction is reached when a sample examined under the microscope shows unitary orange-red needles. The whole is allowed to cool to 80° C., filtered with suction, and the filter residue is washed with cold dichlorobenzene until the washings are colorless. Then the dichlorobenzene is displaced with benzene and dried at 60–70° C. in vacuo. The chloride is obtained as a red-orange finely crystalline powder. It is extremely sparingly soluble in organic solvents, and it decomposes when heated above 290° C. without previously melting.

14.28 parts of the resulting acid chloride are stirred with 0.1 part of thionyl chloride in 200 parts of ortho-dichlorobenzene and heated up to 100° C. There are then added 6 parts of ortho-phenetidine and 2 parts of pyridine dissolved in 20 parts of ortho-dichlorobenzene, and the whole is heated for 12 hours at 135–140° C. The mixture is then filtered with suction, and the filter residue is washed with hot ortho-dichlorobenzene until the washings are colorless, and then washed with methanol until the initially strongly colored washings have become colorless. The product is finally washed with hot water.

By drying the product there is obtained a yellow soft pigment, which imparts to polyvinyl chloride strong reddish yellow tints of excellent fastness to migration.

In the following table are given further pigment dyestuffs which are obtained by coupling 2 mols of the aminoaryl-carboxylic acid mentioned in column I with 1 mol of the bis-acetoacetylamino compound mentioned in column II, converting the dyestuff into the dicarboxylic acid dichloride, and condensing the latter with 2 mols of the arylamine mentioned in column III:

then added 4.66 parts of ortho-toluidine and 2 parts of pyridine dissolved in 40 parts of ortho-dichlorobenzene, and the mixture is heated for 12 hours at 135–140° C. The brown coloration of the acid chloride disappears and the mixture acquires a pure yellow color. The whole is then allowed to cool to 90° C., 2 parts of anhydrous sodium acetate are added, and the whole is stirred for a further 5 minutes at that temperature and then filtered with suction. The filter residue is washed with hot dichlorobenzene until the washings are colorless, and it is then washed with methanol and finally with hot water.

| | I<br>Diazo-component | II<br>Coupling component | III<br>Arylamine | IV<br>Tint of material dyed with the dyestuff |
|---|---|---|---|---|
| 1 | 4-Chloro-3-amino-benzoic acid | 4:4'-Bis-acetoacetyl-amino-3:3'-dimethyl-diphenyl | Aniline | pure orange. |
| 2 | ----do---- | ----do---- | o-Toluidine | orange-yellow. |
| 3 | ----do---- | ----do---- | 4-Chloro-2-anisidine | reddish yellow. |
| 4 | ----do---- | ----do---- | Chloro-cresidine | yellow-orange. |
| 5 | ----do---- | 4:4'-Bis-acetoacetyl-amino-3:3'-dimethoxy-diphenyl | Aniline | Do. |
| 6 | ----do---- | ----do---- | o-Toluidine | pure-orange. |
| 7 | ----do---- | ----do---- | o-Anisidine | orange-yellow. |
| 8 | ----do---- | ----do---- | 4-Chloro-2-anisidine | orange. |
| 9 | ----do---- | 3:3'-Bis-acetoacetyl-amino-4:4'-dimethyl-1:1'-diphenyl-methane | o-Toluidine | greenish yellow. |
| 10 | ----do---- | ----do---- | o-Chloraniline | Do. |
| 11 | 4-Aminobenzoic acid | 4:4'-Bisacetoacetyl-amino-3:3'-dichlorodiphenyl | o-Anisidine | reddish yellow. |
| 12 | ----do---- | ----do---- | p-Xylidine | pure yellow. |
| 13 | 4-Chloro-3-amino-benzoic acid | 4:4'-Bis-acetoacetyl-amino-di-phenyl ether | o-Toluidine | Do. |
| 14 | ----do---- | 1:5-Bis-acetoacetyl-amino-naphthalene | 5-Chloro-2-toluidine | dull yellow. |
| 15 | ----do---- | 4:7-Bis-acetoacetyl-amino-di-phenylene oxide | o-Toluidine | pure yellow. |
| 16 | ----do---- | 2:6-Bis-acetoacetyl-amino-anthraquinone | ----do---- | reddish yellow. |
| 17 | ----do---- | 4:4'-Bis-acetoacetyl-amino-azo-benzene | ----do---- | pure yellow. |
| 18 | 4'-Amino-diphenyl-4-carboxylic acid | 2:5-Dichloro-1:4-bis-acetoacetyl-amino-benzene | 6-Chloro-2-toluidine | yellow. |

Example 4

71.7 parts of the dyestuff from 2 mols of diazotized 4-chloro-3-aminobenzoic acid and 1 mol of benzidine-dipyrazolene are stirred with 10 parts of dimethylformamide in 800 parts of ortho-dichlorobenzene at 100–105° C. 32.8 parts of thionyl chloride are then run in in the course of 15 minutes, and the whole is stirred for 2–3 hours at 105–110° C. The end point of the reaction can be recognized by the cessation of the splitting off of hydrogen chloride, and from the fact that a sample examined under the microscope shows unitary yellowish brown lamellae. The whole is cooled to 80–90° C., then filtered with suction, and the crystals are washed with dichlorobenzene until the washings are colorless. The product is then washed with benzene and petroleum ether, and dried in vacuo at 40–50° C. There are then obtained about 70 parts of the dicarboxylic acid dichloride of the formula

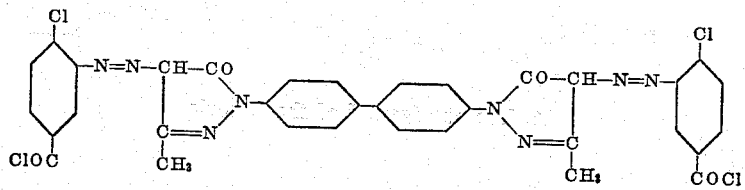

It is a yellowish brown crystalline powder, which is only slightly soluble in the usual organic solvents. When heated it decomposes at temperatures above 270° C.

14.96 parts of the acid chloride so obtained are stirred with 0.1 part of thionyl chloride in 200 parts of ortho-dichlorobenzene and heated to 100–105° C. There are After being dried, the product is a yellow soft pigment, which, when rolled into polyvinyl chloride, yields strong reddish yellow dyeings of very good fastness to migration.

Dyestuffs having similar properties are obtained by using in this example, instead of the ortho-toluidine, aniline, ortho-anisidine, 5-chloro-2-aminotoluene or 2:5-dimethylaniline.

Example 5

34.5 parts of 2:5-dichloro-1:4-phenylene diamine are stirred in 140 parts of glacial acetic acid, and 34 parts of diketene are run in at 40° C. while stirring well. The temperature of the reaction mixture rises spontaneously to 85–95° C. When, in a short time, a clear solution is obtained, the dicondensation product begins to crystallise out. The whole is stirred for 1 hour at 90–95° C. and is then allowed to cool to room temperature. The thick crystalline magma is filtered off with suction, washed with acetic acid of 40% strength, and then with cold water until the washings are neutral to litmus. By drying the product there is obtained 2:5-bis-acetoacetylamino-1:4-dichlorobenzene as a white crystalline powder in excellent yield. It dissolves in dilute caustic alkali solutions to give a clear colorless solution. It melts at 205–206° C.

In the same manner there are obtained the following bis-acetoacetic acid arylides which have not hitherto been described in the literature.

2-chloro-1:4-bis-acetoacetylaminobenzene, melting at 115–117° C.
2:6-dichloro-1:4-bis-acetoacetylaminobenzene, melting at 124–125° C.
2:3:5:6-tetrachloro - 1:4 - bis - acetoacetylaminobenzene, melting at 142–143.5° C.
2-methyl-1:4-bis-acetoacetylaminobenzene, melting at 146° C.
2-methyl-5-chloro-1:4-bis-acetoacetylaminobenzene, melting at 190–192° C.
2:6 - dimethyl - 3:5-dichloro-1:4-bis-acetoacetylamino- benzene, melting at 279° C.
2-methoxy-1:4-bis-acetoacetylaminobenzene, melting at 158–159° C.
2-methoxy - 5 - chloro-1:4-bis-acetoacetylamino-benzene, melting at 157–158° C.
2-methoxy - 5 - methyl-1:4-bis-acetoacetylaminobenzene, melting at 154–156° C.
2:5-dimethyl-1:4-bis - acetoacetylaminobenzene, melting at 239–241° C.
2:4-dimethyl-1:5-bis-acetoacetylaminobenzene, melting at 178–179° C.
2:6-dimethyl-1:3-bis-aceto - acetylaminobenzene, melting at 199–200° C.
2:5 - dimethoxy - 1:4-bis-acetacetylaminobenzene, melting at 214–216° C.
2:3:5:6 - tetramethyl - 1:4 - bis-acetoacetylaminobenzene, melting at 296° C.
2:5 - dimethoxy - 1:4-bis-acetoacetylaminobenzene, melting at 213–214° C.

What is claimed is:

1. An azo-dyestuff which is free from groups imparting solubility in water and corresponds to the formula

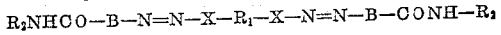

in which B and $R_1$ represent members selected from the group consisting of benzene and diphenyl radicals, $R_2$ represents an aryl radical having at most 4 benzene nuclei which are directly connected with one another and X represents a member selected from the group consisting of an acetoacetylamino radical bound by the amide nitrogen atom to $R_1$ and by the methylene group to the azo group, and of a pyrazolone-5 radical bound by the N-atom in 1-position to $R_1$ and by the methylene group to the azo group, the radicals $R_1$, $R_2$ and B bearing as substituents members selected from the group consisting of hydrogen and halogen atoms, and lower alkyl, lower alkoxy, nitro and benzoylamino groups.

2. An azo-dyestuff which is free from groups imparting solubility in water and corresponds to the formula

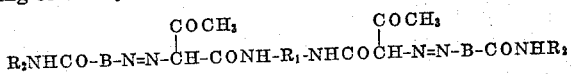

in which $R_1$ and B represent radicals selected from the group consisting of benzene and diphenyl radicals and $R_2$ represents an aryl radical having at most 4 benzene nuclei which are directly connected with one another, the radicals $R_1$, $R_2$ and B bearing as substituents members selected from the group consisting of hydrogen and halogen atoms, lower alkyl, lower alkoxy, nitro and benzoylamino groups.

3. An azo-dyestuff which is free from groups imparting solubility in water and corresponds to the formula

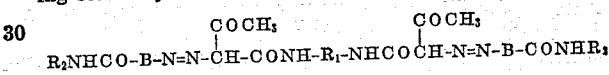

in which B and $R_2$ represent benzene radicals, and $R_1$ a benzene radical in which the —NH— groups are in 1,4-position and which contains at least one substituent selected from the group consisting of chlorine atoms, and methoxy and methyl groups.

4. The azo-dyestuff of the formula

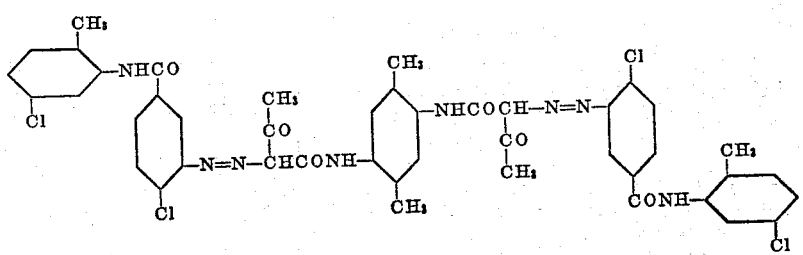

5. The azo-dyestuff of the formula

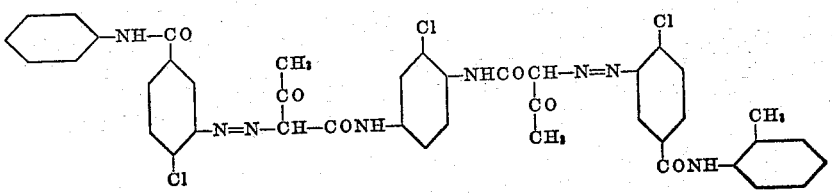

6. The azo-dyestuff of the formula

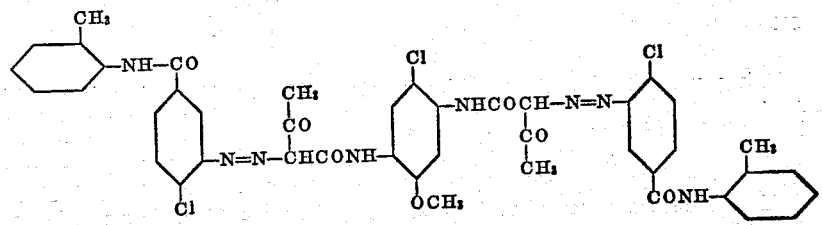

7. The azo-dyestuff of the formula
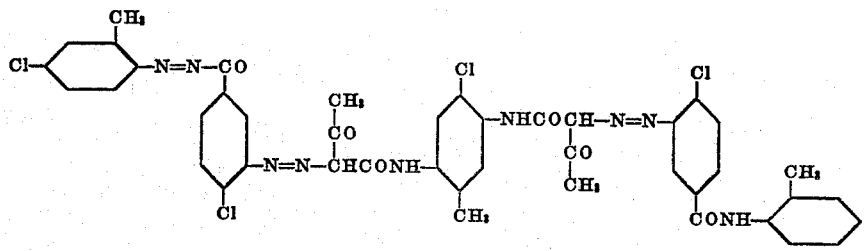
8. The azo-dyestuff of the formula
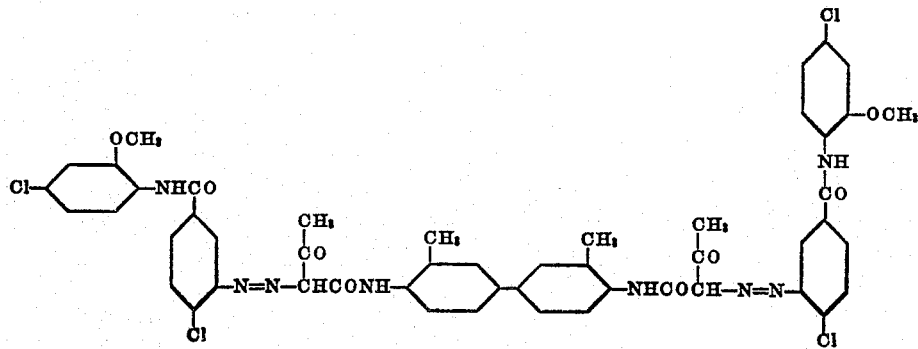
References Cited in the file of this patent
UNITED STATES PATENTS
| | | |
|---|---|---|
| 1,940,662 | Clingestein et al. | Dec. 26, 1933 |
| 1,999,438 | Bonhote et al. | Apr. 30, 1935 |
| 2,515,546 | Bossard et al. | July 18, 1950 |
| 2,538,180 | Widmer | Jan. 16, 1951 |
| 2,591,470 | Schmid et al. | Apr. 1, 1952 |